UNITED STATES PATENT OFFICE.

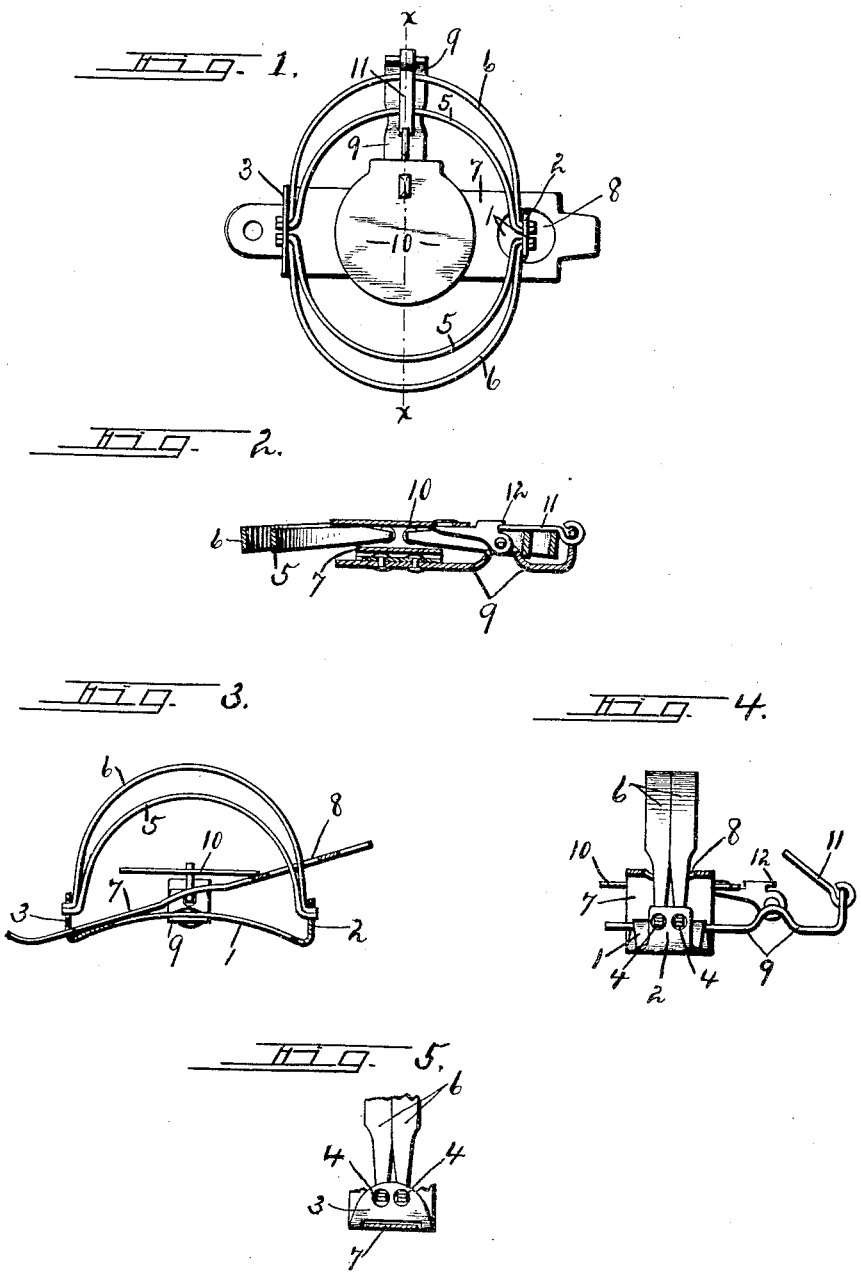

FERRAND F. ELLIS, OF ONEIDA, NEW YORK, ASSIGNOR TO ONEIDA COMMUNITY, LIMITED, OF ONEIDA, NEW YORK, A CORPORATION OF NEW YORK.

STEEL ANIMAL-TRAP.

1,056,157. Specification of Letters Patent. Patented Mar. 18, 1913.

Application filed June 21, 1911. Serial No. 634,436.

*To all whom it may concern:*

Be it known that I, FERRAND F. ELLIS, of Oneida, in the county of Madison, in the State of New York, have invented new and useful Improvements in Steel Animal-Traps, of which the following, taken in connection with the accompanying drawings, is a full, clear, and exact description.

This invention relates to improvements in what are known as steel animal traps and has more particular reference to traps which are adapted to catch animals which are larger and stronger than the ordinary house rat, such as muskrat and the like.

In order to produce an efficient trap for such purposes, I have provided a trap with an auxiliary pair of co-acting jaws for the purpose of insuring greater retaining efficiency.

My object, therefore, is to construct such a trap, having supplemental co-acting jaws and having more particular reference to journaling said jaws in the base plate so as to employ a minimum number of openings and thereby avoid weakening of the base-plate and at the same time insuring the simultaneous co-action of the jaws, and to that end, my invention consists in the several new and novel features of construction and operation which are hereinafter described and specifically set forth in the claim hereunto annexed.

It is constructed as follows, reference being had to the accompanying drawings which form a part of the specification herein and in which—

Figure 1, shows a top plan view of the trap in its set position. Fig. 2 is a section on line X X, Fig. 1. Fig. 3 is a side view of the trap in its normal position; parts of the spring and base being broken away to more clearly show the journaling of the jaws. Fig. 4 is an end view thereof; a portion of the spring being removed, and Fig. 5 is a detail of the jaws, showing their engagement with the up-turned end of the base, a part of the spring being removed.

Similar letters of reference indicate corresponding parts in all of the figures.

—1— is a base plate having up-turned ends —2— and —3—, said up-turned ends each having a pair of perforations —4— as shown in Figs. 4 and 5.

—5— and —6— are the engaging jaws spaced some distance apart, so as to afford greater gripping engagement with the animal. The jaws 5 are the main jaws, while the jaws 6 are the supplemental or outer jaws, which close over the main or inner jaws in lines co-incident with the main or inner jaws. Each pair of jaws —5— and —6— converge toward their ends and are loosely mounted in the perforation —4— so as to co-act when forced together by the operation of the springs.

—7— is a spring plate which is secured at one end with the base —1—.

Adjacent the opposite end of the spring plate —7— is a perforation —8— which allows the spring to engage the outer edges of the pairs of jaws —5— and —6— to force them together in the usual way. —9— is the usual cross-bar having a tripping pan —10— pivoted thereto and overhanging the spring, and —11— is a tripping latch engaging the pivoted tripping lip —12—, to which the pan is secured, all in the usual and well known manner.

It will be noted that when the tripping latch releases the spring actuated jaws, that each pair of jaws will operate simultaneously and co-act with the opposite jaws so as to grip the animal in two different places and thereby more efficiently retain it.

It will also be observed that by mounting supplemental jaws in one and the same opening, I am able to utilize all of the tension in the spring which would otherwise be impossible.

What I claim is:

A steel trap comprising a base plate having apertured ends extending at an angle thereto, independent inner and outer co-acting jaws, the jaws of each pair of said co-acting jaws journaled in the same apertures in said ends, tensioning means common to both pairs of jaws, and a latch for engagement with one jaw of each pair of jaws for holding all the jaws in open position and under tension.

In witness whereof I have hereunto set my hand on this 16th day of June 1911.

FERRAND F. ELLIS.

Witnesses:
O. D. WRIGHT,
S. S. ELBRIDGE.

Copies of this patent may be obtained for five cents each, by addressing the "Commissioner of Patents, Washington, D. C."